(12) United States Patent
Louch et al.

(10) Patent No.: US 8,423,914 B2
(45) Date of Patent: Apr. 16, 2013

(54) SELECTION USER INTERFACE

(75) Inventors: John O. Louch, San Luis Obispo, CA (US); Christopher Hynes, Santa Cruz, CA (US); Timothy Wayne Bumgarner, Sharpsburg, MD (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 940 days.

(21) Appl. No.: 11/760,609

(22) Filed: Jun. 8, 2007

(65) Prior Publication Data

US 2008/0307361 A1 Dec. 11, 2008

(51) Int. Cl.
*G06F 3/048* (2006.01)

(52) U.S. Cl.
USPC ............ 715/860; 715/835; 715/823; 715/859

(58) Field of Classification Search .................. 715/823, 715/860, 859, 835, 822, 845
See application file for complete search history.

(56) References Cited

U.S. PATENT DOCUMENTS

| | | | |
|---|---|---|---|
| 6,990,452 B1 * | 1/2006 | Ostermann et al. | 704/260 |
| 7,656,408 B1 * | 2/2010 | Brandt et al. | 345/473 |
| 2003/0014490 A1 * | 1/2003 | Bates et al. | 709/206 |
| 2004/0119763 A1 * | 6/2004 | Mizobuchi et al. | 345/863 |
| 2006/0252478 A1 * | 11/2006 | Eto | 463/9 |
| 2006/0277496 A1 * | 12/2006 | Bier et al. | 715/810 |
| 2007/0061745 A1 * | 3/2007 | Anthony et al. | 715/764 |
| 2007/0229471 A1 * | 10/2007 | Kim et al. | 345/173 |
| 2009/0150828 A1 * | 6/2009 | Baker et al. | 715/835 |

OTHER PUBLICATIONS

"Selecting multiple items on the screen", May 19, 2006, www.ofzenandcomputing.com/zanswers/63.*
"To Click or to Double Click?",2003. www.geekgirls.com/windows_clicking.htm.*
"To Click or to Double Click?", 2003. www.geekgirls.com/windows_clicking.htm.*
"GeekGirls source code," [online] [Retrieved from the Internet May 25, 2010] Retrieved from the Internet URL: www.geekgirls.com/windows_clicking.htm, 6 pages.

* cited by examiner

*Primary Examiner* — Andrea Leggett
(74) *Attorney, Agent, or Firm* — Fish & Richardson P.C.

(57) ABSTRACT

Selection of visualization objects, such as icons, is represented by a flowing selection boundary. The region enclosed by the selection boundary can include a display properly, e.g., color and/or texture. The display property may be adjusted in response to an identified event, e.g., the presence of a cursor or a pending and/or active operation.

25 Claims, 7 Drawing Sheets

SELECTION USER INTERFACE

BACKGROUND

A graphical user interface allows a large number of graphical objects or items to be displayed on a display screen at the same time. Leading personal computer operating systems, such as the Apple Mac OS®, provide user interfaces in which a number of graphical representations of system objects can be displayed according to the needs of the user. Example system objects include system functions, alerts, windows, peripherals, files, and applications, Taskbars, menus, virtual buttons, a mouse, a keyboard, and other user interface elements provide mechanisms for accessing and/or activating the system objects corresponding to the displayed representations.

The graphical objects and access to the corresponding system objects and related functions, however, should be presented in a manner that facilitates an intuitive user experience. The use of metaphors that represent concrete, familiar ideas facilitate such an intuitive user experience. For example, the metaphor of a document or photo can be used to identify an electronic file; the metaphor of file folders can be used for storing documents, etc.

Often several or more graphical objects, e.g., icons, may be selected by a user. For example, a user may select icons related to several photographic image files from a dozen or more displayed icons. Presently, many graphical user interfaces indicate such selections by highlighting a border of a selected icon. Such highlighted selections, however, may not be readily apparent and/or may introduce visual "clutter" when a user has selected a subset of displayed icons.

SUMMARY

Disclosed herein is a selection user interface. In an implementation, a computer-implemented method receives one or more selection inputs to select graphical representations of system objects, e.g., icons, displayed in a graphical user interface. One or more selection boundaries are generated in response to the one or more selection inputs. An animated boundary flow is generated to expand the one or more selection boundaries to surround the selected graphical representations of system objects.

In another implementation, a computer-readable medium stores instructions that upon execution cause a processing device to generate a graphical user interface on a display device and facilitate the processes of receiving one or more selection inputs to select icons displayed in the graphical user interface, generating one or more selection boundaries, and animating expansions of the one or more selection boundaries to surround the selected icons.

In another implementation, a computer-implemented method generates a selection boundary surrounding selected icons in a graphical user interface, and generates a background color within the selection boundary. In response to identifying an event occurrence related to the selection boundary, a display characteristic of the background color can be adjusted.

DETAILED DESCRIPTION

Figure 1:
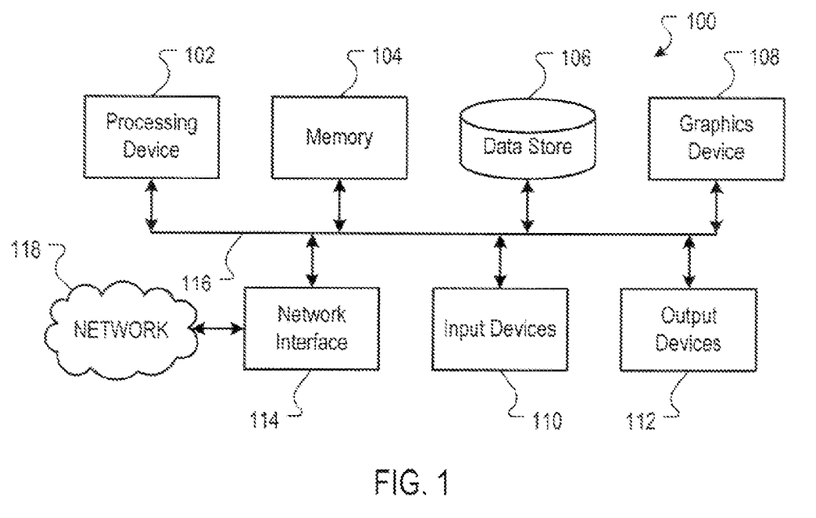
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as any one of the personal computer devices available from Apple Inc., or other electronic devices. Other example implementations can also include video processing devices, multimedia processing devices, portable computing devices, portable communication devices, set top boxes, and other electronic devices.

The example system 100 includes a processing device 102, a first data store 104, a second data store 106, a graphics device 108, input devices 110, output devices 112, and a network device 114. A bus system 116, such as a data bus and a motherboard, can be used to establish and control data communication between the components 102, 104, 106, 108, 110, 112 and 114. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

The graphics device 108 can, for example, include a video card, a graphics accelerator card, or a display adapter, and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can include one or more local area networks (LANs) or a wide area network (WAN), such as the Internet.

In an implementation, the system 100 includes instructions defining an operating system stored in the first data store 104 and/or the second data store 106. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
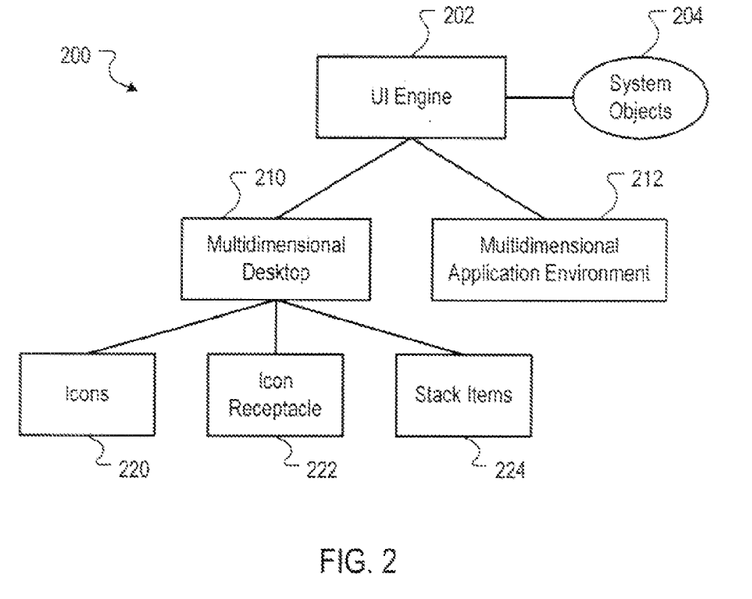
FIG. 2 is a block diagram of an example user interface architecture.

FIG. 2 is a block diagram of an example user interface architecture 200. The user interface architecture 200 includes a user interface (UI) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a multidimensional desktop 210 and a multidimensional application environment 212. In some implementations, the multidimensional desktop 210 and the multidimensional application environment 212 are two-dimensional environments, e.g., a "2D" desktop having only an x- and y-axis aspects.

In some implementations, the multidimensional desktop 210 and the multidimensional application environment 212 include x-, y- and z-axis aspects, e.g., a height, width and depth aspect. The x-, y- and z-axis aspects may define a three-dimensional environment, e.g., a "3D" or "2.5D" environment that includes a z-axis, e.g., depth, aspect.

In an implementation, the multidimensional desktop 210 can include icons 220, an icon receptacle 222, and stack items 224. The icons 220, the icon receptacle 222 and the stack items 224 can be presented in the two-dimensional environment as graphical objects having height and width aspects, or can be presented in the three dimensional environment as graphical objects having height, width and depth aspects.

Figure 3:
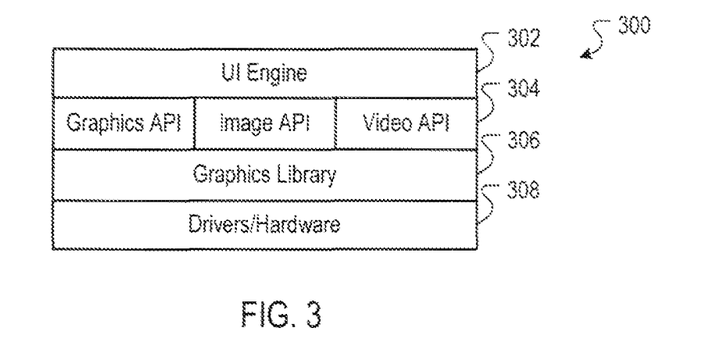
FIG. 3 is a block diagram of an example system layer structure that can be utilized to implement the systems and methods described herein.

FIG. 3 is block diagram of example system layers 300 that can be utilized to implement the systems and methods described herein. Other system layer implementations, however, can also be used.

In an implementation, a user interface engine, such as the UI engine 202, or another UI engine capable of generating a multidimensional user interface environment, operates at an application level 302 and implements graphical functions and features available through an application program interface (API) layer 304. Example graphical functions and features include graphical processing, supported by a graphics API, image processing, support by an imaging API, and video processing, supported by a video API.

The API layer 304, in turn, interfaces with a graphics library layer 306. The graphics library layer 304 can, for example, be implemented as a software interface to graphics hardware, such as an implementation of the OpenGL specification. A driver/hardware layer 308 includes drivers and associated graphics hardware, such as a graphics card and associated drivers.

FIGS. 4A-4E are block diagrams of a selection user interface 400. The example selection user interface 400 can be implemented in system 100 of FIG. 1. In the example implementation, visual representations of system objects, e.g., icons 402-432, are displayed in a grid arrangement. The icons 402-432 can, for example, represent flies and/or folders in a window associated with a folder or on a portion of a desktop; or can represent system applications; or can represent one or more other types of system objects. Furthermore, although a grid arrangement is illustrated, other icon arrangements can also be used, e.g., a list arrangement, or an arrangement specified by a user, or some other type of arrangement.

The selection user interface 400, as depicted in FIG. 4, facilitates the selection of five particular icons selected by a user, e.g., icons 402, 410, 412, 422 and 424. A selection boundary 440 surrounds the selected icons 402, 410, 412, 422 and 424 to emphasize the selection.

Figure 4A:
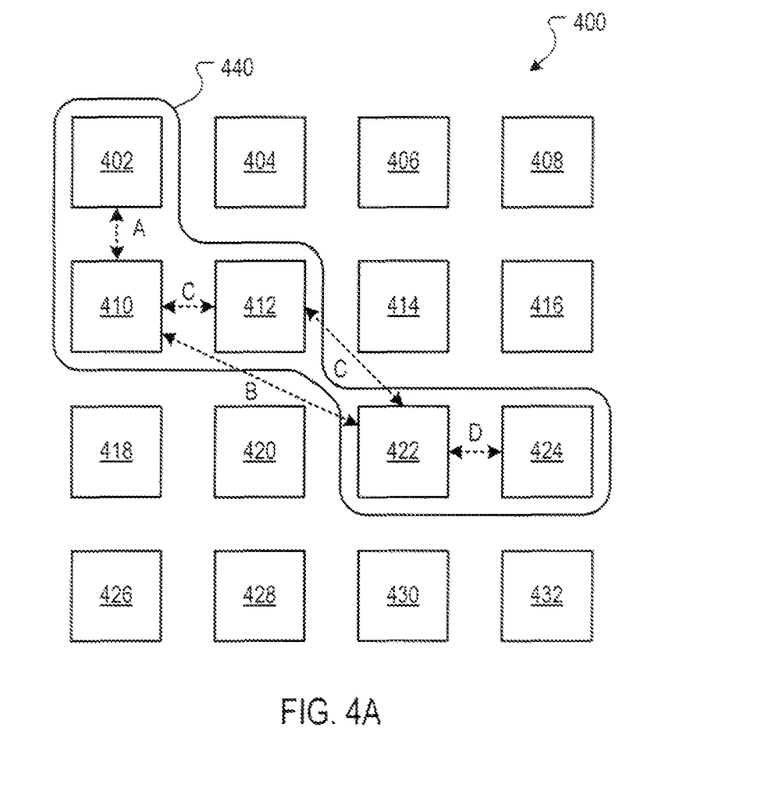
FIGS. 4A-4E are block diagrams of a selection user interface.

In an implementation, upon processing of a selection input to select one or more icons, one or more selection boundaries are generated. For example, several selection inputs may be received to select the icons 402, 410, 412, 422 and 424 in the following order: 402, 410, 422, 412, and 424. In some implementations, upon each selection of an icon, a corresponding selection boundary is generated around the icon, and an animated boundary flow is generated to expand the selection boundaries to surround the selected icons. For example, the sequential selection of the icons 402, 410, 422, 412 and 424 would generate corresponding boundary flows in general directions of respective arrows A, B, C and D.

Figure 4B:
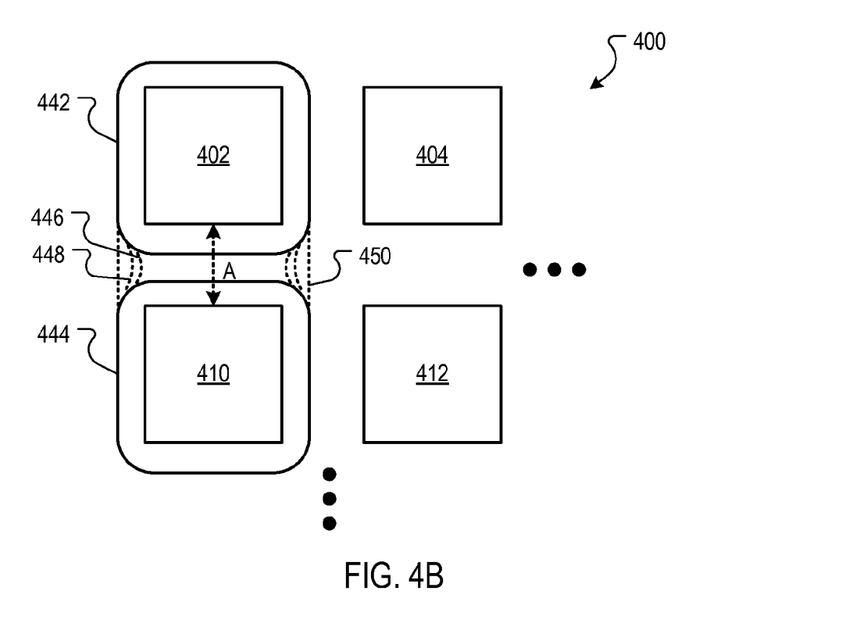
Figure 4C:
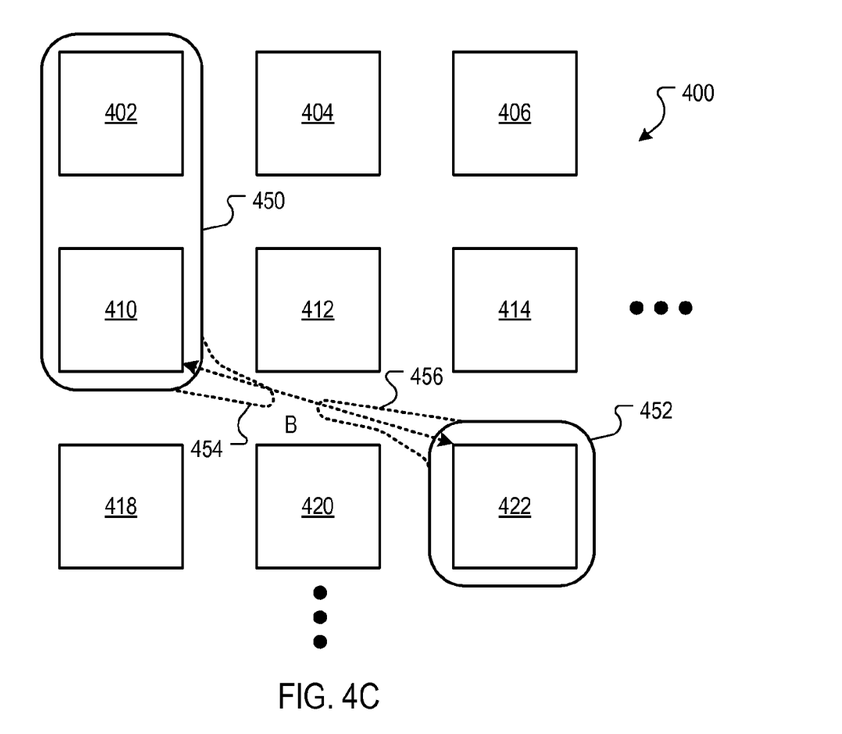
Figure 4D:
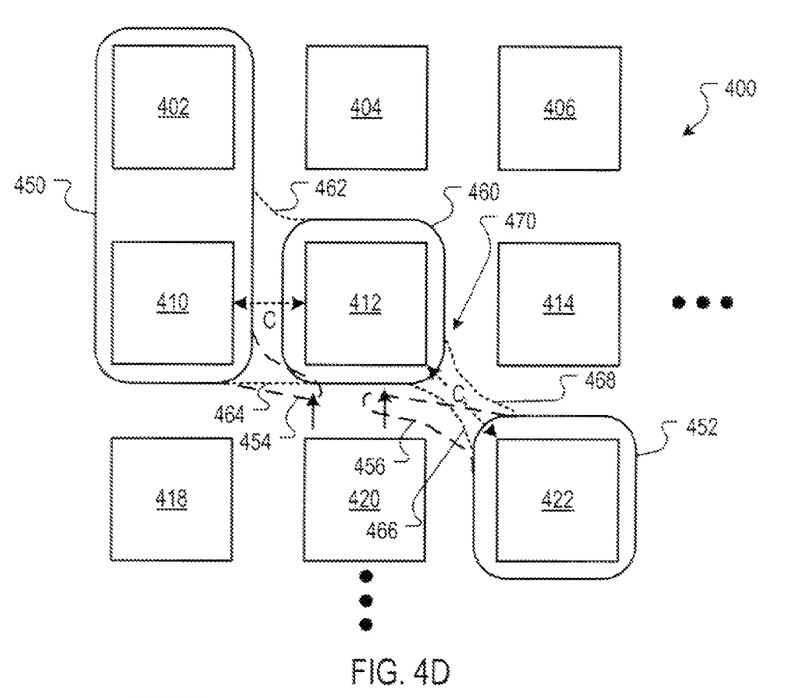
Figure 4E:
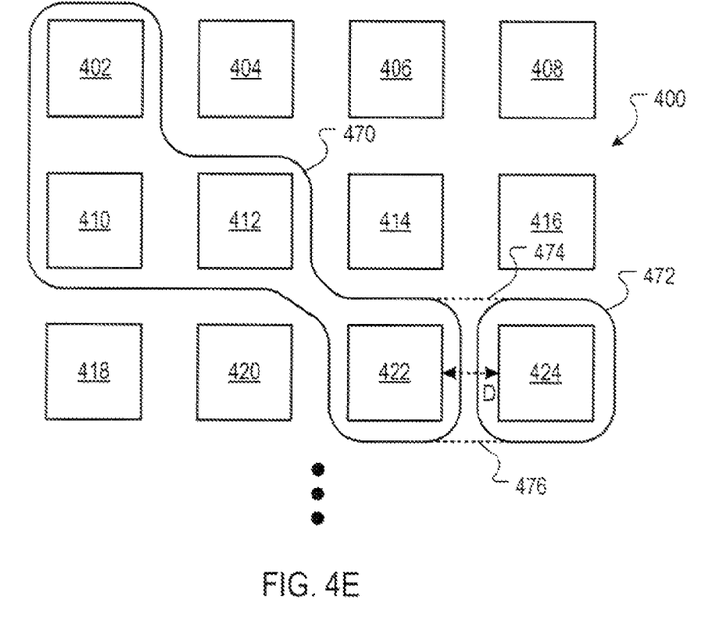

FIGS. 48-4E represent the progression of corresponding boundary flows for the sequential selection of the icons 402, 410, 422, 412 and 424. FIG. 48 illustrates the boundary flow generated from the sequential selection of icons 402 and 410. In response to a selection of the icon 402, a corresponding selection boundary 442 is generated around the icon 402. Likewise, in response to a selection of the icon 410, a corresponding selection boundary 444 is generated around the icon 410. Thereafter, the selection boundaries 442 and 444 begin to merge together by an animated boundary flow in the general direction of the arrow A.

In the implementation of FIG. 48, the boundary flow expands to encompass the region defined by the adjacent icons 402 and 410. In some implementations, the boundary flow can be uniform to animate the merger of the selection boundaries 442 and 444 beginning at the longitudinal axis coincident with the arrow A and extending outward, as illustrated by the expanding contours 448 and 448. Eventually the selection boundaries 442 and 444 merge into a final selection boundary 450.

FIG. 4C illustrates the boundary flow generated from the sequential selection of icons 410 and 422. In response to the selection of the icon 422, a corresponding selection boundary 452 is generated around the icon 422. Thereafter, the selection boundaries 450 and 452 begin to merge together by an animated boundary flow in the general direction of the arrow B. In some implementations, the boundary flow can expand the selection boundaries 450 and 452 to extend within the region defined by the icons 410 and 422 that are divided by the unselected icons 412 and 420. Accordingly, the selection boundary 450 can flow generally along the path of arrow B, as indicated by the boundary flow 454. Likewise, the selection boundary 452 can flow generally along the path of arrow B, as indicated by the boundary flow 456, until the boundary flows 454 and 456 merge.

FIG. 4D illustrates the boundary flow generated from the sequential selection of icons 422 and 412 prior to the time at which the boundary flows 454 and 456 merge. In response to the selection of the icon 412, a corresponding selection boundary 460 is generated around the icon 412. Thereafter, the selection boundaries 450 and 452 and 460 begin to merge together by an animated boundary flow in the general direction of the arrows C. Additionally, the boundary flows 454 and 456 propagate upward toward the selection boundary 460, as indicated by the upward arrows. Eventually the selection boundaries 450, 452 and 460 merge into a final selection boundary 470, as indicated by the selection boundaries 462, 464, 466 and 468, and as shown in FIG. 4E.

FIG. 4E illustrates the boundary flow generated from the sequential selection of icons 422, 412 and 424. In response to the selection of the icon 424, a corresponding selection boundary 470 is generated around the icon 424. Thereafter, the selection boundaries 470 and 472 begin to merge together by an animated boundary flow in the general direction of the arrow D. Eventually the selection boundaries 470 and 472 merge into the final selection boundary 440 of FIG. 4A, as indicated by the selection boundaries 474 and 476.

In the example implementation of FIGS. 4A-4E, the selection boundaries expand and merge into a single selection boundary that surrounds the selected icons 402, 410, 412, 422 and 424. Such selection animation can, for example, convey to the user common features about a selection, or emphasize the selection from a background, and/or allow a user to facilitate further selections. For example, dragging an unselected icon and dropping the icon into the selection boundary can cause the icon to likewise become selected. Other advantages can also be realized.

Figure 5:
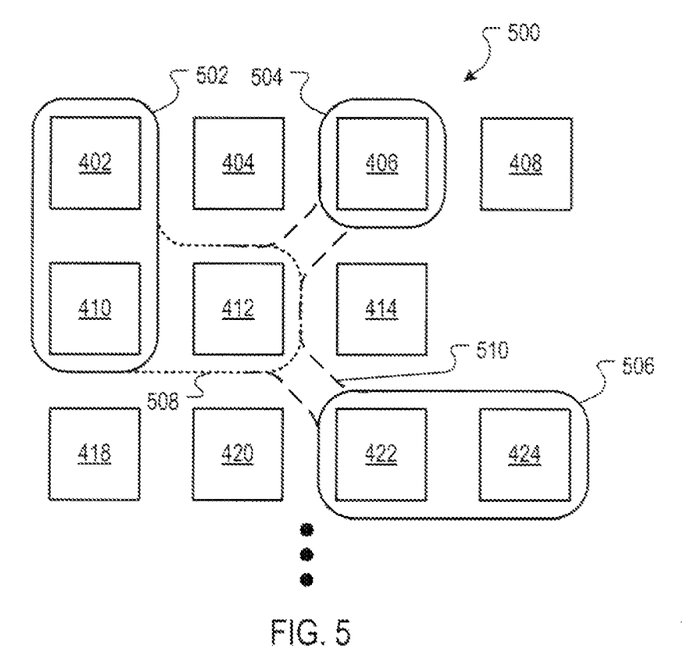
FIG. 5 is a block diagram of another example selection user interface.

In some implementations, selection boundaries only merge for adjacent icons. For example, FIG. 5 is a block diagram of another example selection user interface 500 in which the selection boundaries 502, 504 and 506 do not extend within the regions defined by divided selected loons. For example, the selected adjacent icons 402 and 410 are divided from selected icons 406, 422 and 424, i.e., the unselected icons 404, 412 and 420 are between the selection boundaries 502, 504 and 506. Likewise, the selected icon 406 is divided from the selected icons 402, 410, 411, and 424, and the selected icons 422 and 424 are divided from the selected icons 402, 406 and 410.

In some implementations, selection boundaries can be precluded from extending across diagonal divisions. For example, if the icon 412 is selected, then the icons 402, 410 and 412 can be surrounded a selection boundary defined by the common intersection of the selection boundary 502 and the first phantom selection boundary 508. The selection boundaries 504 and 506 would not merge into the selection boundary surrounding the icons 402, 410 and 412, as the icons 406 and 422 are diagonally divided from the icon 412.

In some implementations, selection boundaries can be allowed to extend across diagonal divisions. For example, if the icon 412 is selected, then the icons 402, 410 and 412 422 and 424 can be surrounded a selection boundary defined by the common intersection of the selection boundary 502, the first phantom selection boundary 508, and the second phantom selection boundary 510. The selection boundary 440 of FIG. 4A is another example of a selection boundary that can extend across diagonal divisions.

In some implementations, the region surrounded by the selection boundary can define a background color. In some implementations, the background color can be coded according to the type of documents selected. For example, selection of word processing documents can generate a blue background color; selection of photographs can generate a green background color, etc. In some implementations, if documents of different types are selected, a default background color, e.g., red, can be generated. In some implementations, if documents of different types are selected, the region within the selection boundary can change corresponding colors for each selected document according to a color gradient. In some implementations, the flow of the selection boundary can be modeled on a fluid flow, and a user may select from different fluid flow properties, e.g., "Highly Viscous," "Water," "Lava," etc.

In some implementations, the region surrounded by the selection boundary can define a texture. In some implementations, the texture can be coded according to the type of documents selected. For example, selection of word processing documents can generate a sandy texture; selection of photographs can generate a pebbled texture, etc. In some implementations, if documents of different types are selected, a default texture, e.g., coffee beans, can be generated. In some implementations, if documents of different types are selected, the region within the selection boundary can change corresponding textures. In some implementations, the flow of the selection boundary can be modeled on a texture, and a user may select from different texture properties, e.g., "Sand," "Ball Bearings," "Pebbles," etc.

In some implementations, a deselection of an icon can cause the selection boundary to recede from the deselected icon in a substantially reversed process by which the icon was surrounded by the selection boundary upon selection. Other deselection animations can also be used, e.g., the background surround the deselected icon may suddenly include an animation of a boiling liquid, and the selection boundary recedes by an evaporation animation.

In some implementations, audio can accompany the animations of boundary flows. For example, a "ball bearing" texture may cause a faint sound of bail bearings rolling across a surface to be generated as the selection boundary moves; a viscous fluid model may cause soft "plops" to be generated when two selection boundaries meet, etc.

Figure 6A:
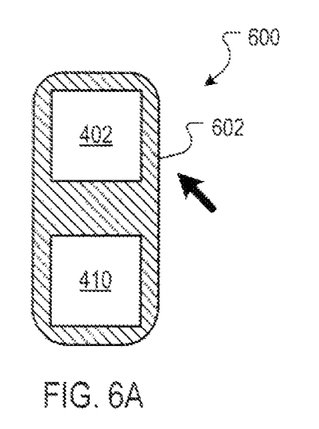
FIGS. 6A and 6B are block diagrams of a state-dependent selection user interface.
Figure 6B:
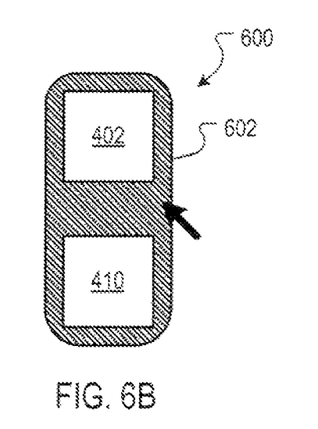

FIGS. 6A and 6B are block diagrams of a state-dependent selection user interface 600. In this implementation, a display property of the region within the selection boundary 602 may change based on the occurrence of an event. For example, the region with the selection boundary 602 may be a first color when a mouse cursor is not within the selection boundary 602, as shown in FIG. 6A, but may be of a second color and/or intensity when the mouse cursor is within the selection boundary 602, as shown in FIG. 6B.

Other events and display adjustments can also be used. For example, the identification of an operation to be performed on system objects represented by the selected graphical representations, e.g., icons 402 and 410, may cause the background to pulse, e.g., if the system objects represented by the icons 402 and 410 are to be deleted, the background may pulse from a low intensify to a high intensity. Likewise, if the system objects represented by the icons 402 and 410 are to be copied; the background may include a bright bar that traverses a longitudinal axis of the selection region to simulate a "scanning" operation; or a subsection of the periphery of the selection boundary may be illuminated and the illuminated subsection of the periphery of the selection boundary may traverse the periphery to simulate a external scanning.

In some implementations, the selection boundary can generate a depth aspect, e.g., the selection boundary can appear to "rise" from a desktop, and the selection icons can likewise rise from the desktop to further emphasize the selection. In one implementation, disparate selection boundaries can thereafter merge after the disparate selection boundaries have risen from the desktop. In some implementations, the selected icons can be further emphasized, e.g., the icons can tilt slightly, or appear to undulate slightly, as if floating on a liquid surface.

Figure 7:
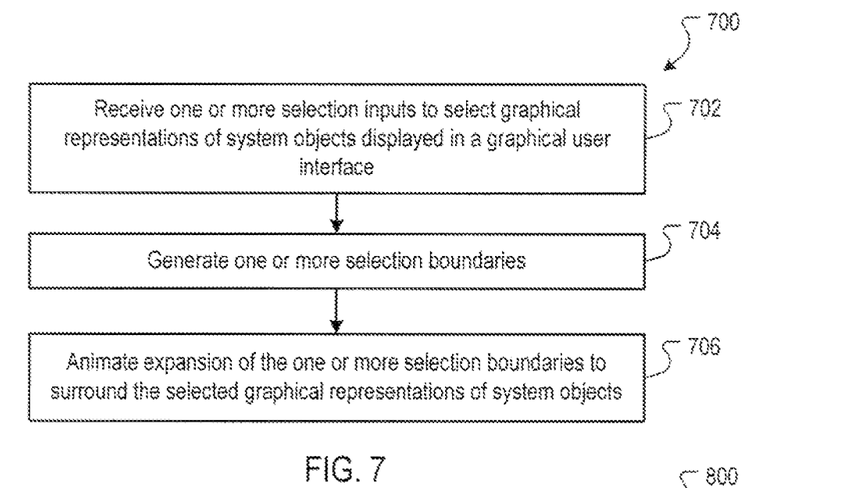
FIG. 7 is a flow diagram of an example process for generating a selection user interface.

FIG. 7 is a flow diagram of an example process 700 for generating a selection user interface. The process 700 can, for example, be implemented in a processing device, such as the system 100 of FIG. 1, implementing user interface software and/or hardware, such as the example implementations described with respect to FIGS. 2 and 3.

Stage 702 receives one or more selection inputs to select graphical representations of system objects displayed in a graphical user interface. For example, the system 100 of FIG.

1, implementing user interface software and/or hardware described in FIGS. 1, 2 and/or 3, can receive selection inputs for the selection of icons.

Stage 704 generates one or more selection boundaries. For example, the system 100 of FIG. 1, implementing user interface software and/or hardware described in FIGS. 1, 2 and/or 3, can generate one or more selection boundaries based on the icons selected.

Stage 706 animates an expansion of the one or more selection boundaries to surround the selected graphical representations of system objects. For example, the system 100 of FIG. 1, implementing user interface software and/or hardware described in FIGS. 1, 2 and/or 3, can animate an expansion of the one or more selection boundaries as described with respect to FIGS. 4B-4E above.

Figure 8:
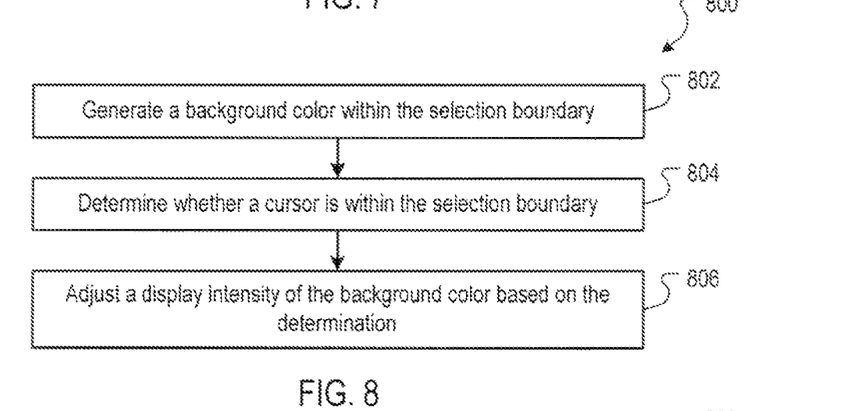
FIG. 8 is a flow diagram of an example process for adjusting a display property of the selection user interface.

FIG. 8 is a flow diagram of an example process 800 for adjusting a display property of the selection user interface. The process 800 can, for example, be implemented in a processing device, such as the system 100 of FIG. 1, implementing user interface software and/or hardware, such as the example implementations described with respect to FIGS. 2 and 3.

Stage 802 generates a background color within the selection boundary. For example, the system 100 of FIG. 1, implementing user interface software and/or hardware described in FIGS. 1, 2 and/or 3, can generate a background color within the selection boundary.

Stage 804 determines whether a cursor is within the selection boundary. For example, the system 100 of FIG. 1, implementing user interface software and/or hardware described in FIGS. 1, 2 and/or 3, can determine whether a mouse cursor is within the selection boundary.

Stage 806 adjusts a display intensity of the background color based on the determination. For example, the system 100 of FIG. 1, implementing user interface software and/or hardware described in FIGS. 1, 2 and/or 3, can adjust a display intensity of the background color if the mouse cursor is within the selection boundary.

Figure 9:
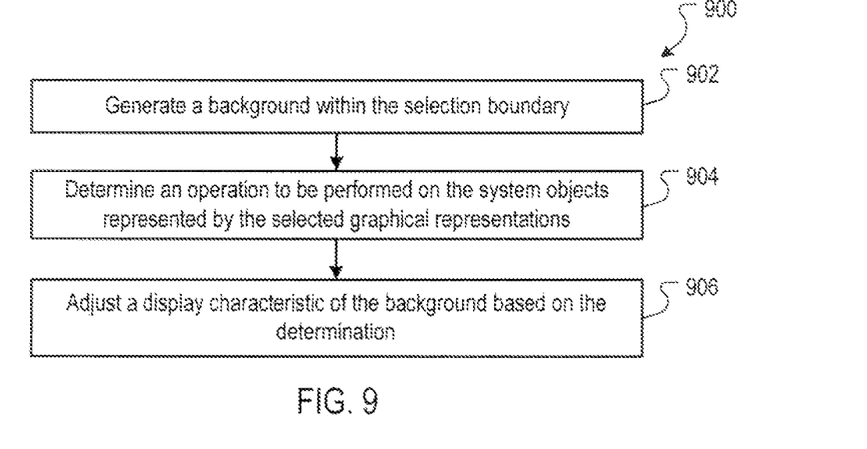
FIG. 9 is a flow diagram of another example process for adjusting a display property of the selection user interface.

FIG. 9 is a flow diagram of another example process 900 for adjusting a display property of the selection user interface. The process 900 can, for example, be implemented in a processing device, such as the system 100 of FIG. 1, implementing user interface software and/or hardware, such as the example implementations described with respect to FIGS. 2 and 3.

Stage 902 generates a background within the selection boundary. For example, the system 100 of FIG. 1, implementing user interface software and/or hardware described in FIGS. 1, 2 and/or 3, can generate a background color and/or texture within the selection boundary.

Stage 904 determines an operation to be performed on the system objects represented by the selected graphical representations. For example, the system 100 of FIG. 1, implementing user interface software and/or hardware described in FIGS. 1, 2 and/or 3, can determine an operation to be performed on the system objects represented by icons, e.g., a delete operation, a mail operation, etc.

Stage 906 adjusts a display characteristic of the background based on the determination. For example, the system 100 of FIG. 1, implementing user interface software and/or hardware described in FIGS. 1, 2 and/or 3, can adjust a display characteristic of the background color and/or texture based on the determination, e.g., the background color can change color and/or intensity; the texture can change form stone to glass; an effect can be animated within the background, etc.

Figure 10A:
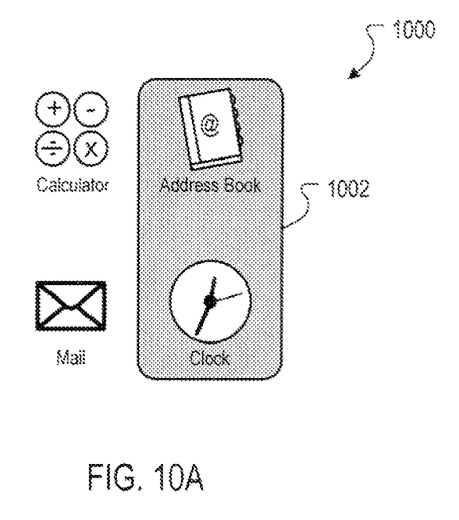
FIGS. 10A and 10B are block diagrams of example selection user interfaces for icons.
Figure 10B:
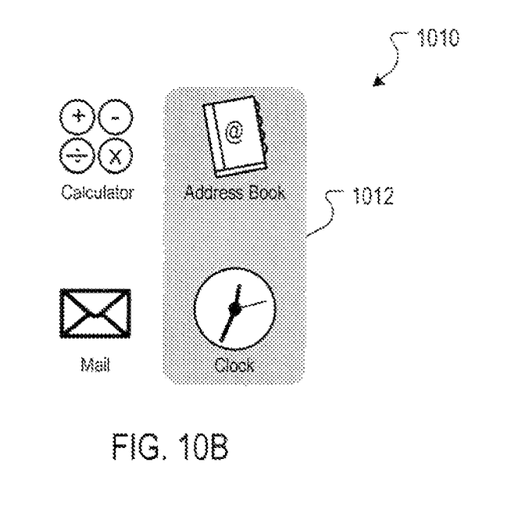

FIGS. 10A and 10B are block diagrams of example selection user interfaces 1000 and 1010 for icons. As shown in FIG. 10A, a selection boundary 1002 surrounds the selected "Address Book" and "Clock" icons, and the region within the selection boundary 1002 has a display characteristic, e.g., color, altered to indicate the selection. The selection user interface 1010 FIG. 10B is similar to selection user interface 1000 of FIG. 10A, except that selection boundary 1012 of FIG. 10B is defined by the contours of the selected region, i.e., the selection boundary 1012 does not have an appreciable width.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
  receiving a first input selecting a first graphical object displayed in a graphical user interface and a second input selecting a second graphical object displayed in the graphical user interface;
  in response to the first input, providing for display a first boundary around the first graphical object;
  in response to the second input, providing for display a second boundary around the second graphical object; and
  expanding a contour of the first boundary toward the second boundary to create a merged boundary wherein, following expansion of the contour of the first boundary, an area enclosed by the first boundary bulges toward the second boundary in an animated flow motion inside of a path confined by one or more unselected graphical objects until the merged boundary surrounds both the first graphical object and the second graphical object.

2. The method of claim 1, wherein:
  at least one of the first graphical object or the second graphical object comprises an icon.

3. The method of claim 2,
  wherein expanding the first boundary toward the second boundary in the animated boundary flow motion includes modeling bulging of the first boundary towards the second boundary after a fluid flow.

4. The method of claim 2, comprising:
  expanding a contour of the second boundary toward the first boundary to create the merged boundary, wherein, following expansion of the contour of the second boundary, an area enclosed by the second boundary bulges toward the first boundary in an animated flow motion inside of the path confined by the one or more unselected graphical objects.

5. The method of claim 2, comprising:
identifying one or more sets of divided selected icons; and
expanding the contour of the first boundary toward each set of divided selected icons, wherein, following expansion of the contour of the first boundary, the area enclosed by the first boundary bulges toward the divided selected icons in another animated flow motion to surround each set of divided selected icons.

6. The method of claim 1, comprising:
generating a background color within the merged boundary.

7. The method of claim 6, comprising:
determining whether a cursor is within the merged boundary; and
adjusting a display intensity of the background color based on the determination.

8. The method of claim 7, wherein:
adjusting the display intensity of the background color based on the determination comprises increasing the display intensity of the background color when the cursor is within the merged boundary.

9. The method of claim 6, comprising:
identifying an operation to be performed on a system object represented by the first graphical object or the second graphical object; and
adjusting a display intensity of the background color based on the operation.

10. The method of claim 6, wherein:
identifying an operation to be performed on a system object represented by the first graphical object or the second graphical object; and
adjusting the background color based on the operation.

11. The method of claim 1, comprising:
receiving a deselection input to deselect the second graphical object; and
contracting a contour of the merged boundary wherein, following contraction of the contour of the merged boundary, the area enclosed by the first boundary retreats toward the first graphical object in another animated flow motion to exclude the deselected second graphical object.

12. The method of claim 1, comprising:
receiving a deselection input to deselect the second graphical object; and
providing for display a boiling animation of the merged boundary to contract the merged boundary to exclude the second graphical object.

13. The method of claim 1, wherein:
the graphical user interface comprises a two-dimensional desktop interface.

14. The method of claim 1, wherein:
the graphical user interface comprises a three-dimensional desktop interface.

15. A non-transitory computer-readable medium storing instructions that are executable by a processing device, and upon such execution cause the processing device to perform operations comprising:
receiving a first input selecting a first icon displayed in a graphical user interface and a second input selecting a second icon displayed in the graphical user interface;
in response to the first input, providing for display a first boundary around the first icon;
in response to the second input, providing for display a second boundary around the second icon; and
expanding a contour of the first boundary toward the second boundary to create a merged boundary wherein, following expansion of the contour of the first boundary, an area enclosed by the first boundary bulges toward the second boundary in an animated flow motion inside of a path confined by one or more unselected graphical objects until the merged boundary surrounds both the first icon and the second icon.

16. The computer-readable medium of claim 15, wherein:
expanding the first boundary toward the second boundary in the animated boundary flow motion includes modeling bulging of the first boundary towards the second boundary after a fluid flow.

17. The computer-readable medium of claim 15, the operations comprising:
identifying one or more sets of divided selected icons; and
expanding the contour of the first boundary toward each set of divided selected icons, wherein, following expansion of the contour of the first boundary, the area enclosed by the first boundary bulges toward the divided selected icons in another animated flow motion to surround each set of divided selected icons.

18. The computer-readable medium of claim 15, the operations further comprising:
generating a background color within the merged boundary;
determining whether a cursor is within the selection boundary; and
increasing a display intensity of the background color when the cursor is within the merged boundary.

19. The computer-readable medium of claim 15, the operations comprising:
generating a background color within the merged boundary;
identifying an operation to be performed on a system object represented by the first icon or second icon; and
adjusting a display intensity of the background color based on the operation.

20. The computer-readable medium of claim 15, the operations comprising:
generating a background color within the merged boundary;
identifying an operation to be performed on a system object represented by the first icon or second icon; and
adjusting the background color based on the operation.

21. A system, comprising:
one or more processing devices; and
a non-transitory computer-readable medium storing instructions that are executable by the one or more processing devices, and upon such execution cause the one or more processing devices to perform operations comprising:
receiving a first input selecting a first graphical object displayed in a graphical user interface and a second input selecting a second graphical object displayed in the graphical user interface;
in response to the first input, providing for display a first boundary around the first graphical object;
in response to the second input, providing for display a second boundary around the second graphical object; and
expanding a contour of the first boundary toward the second boundary to create a merged boundary wherein, following expansion of the contour of the first boundary, an area enclosed by the first boundary bulges toward the second boundary in an animated flow motion inside of a path confined by one or more unselected graphical objects until the merged boundary surrounds both the first graphical object and the second graphical object.

22. The system of claim 21, the operations further comprising:
   generating a background color within the merged boundary;
   identifying an event occurrence related to the merged boundary, including determining whether a cursor is within the selection boundary; and
   adjusting a display characteristic of the background color in response to the identified event occurrence.

23. The system of claim 22, wherein:
   identifying an event occurrence related to the merged boundary comprises identifying an operation to be performed on a system object represented by the first graphical object or second graphical object.

24. The system of claim 22, wherein:
   adjusting the display characteristic of the background color in response to the identified event occurrence comprises adjusting a display intensity of the background color.

25. The system of claim 22, wherein:
   adjusting a display characteristic of the background color in response to the identified event occurrence comprises adjusting the background color based on a determination that an operation is to be performed on a system object represented by the first graphical object or second graphical object.

* * * * *

UNITED STATES PATENT AND TRADEMARK OFFICE
CERTIFICATE OF CORRECTION

| | | |
|---|---|---|
| PATENT NO. | : 8,423,914 B2 | Page 1 of 1 |
| APPLICATION NO. | : 11/760609 | |
| DATED | : April 16, 2013 | |
| INVENTOR(S) | : John O. Louch et al. | |

It is certified that error appears in the above-identified patent and that said Letters Patent is hereby corrected as shown below:

On the Title Page, (57) Abstract, line 3, replace;
        "by the selection boundary can include a display properly, e.g.," with
        -- by the selection boundary can include a display property, e.g., --

Signed and Sealed this
Third Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,423,914 B2 | Page 1 of 1 |
| APPLICATION NO. | : 11/760609 | |
| DATED | : April 16, 2013 | |
| INVENTOR(S) | : John O. Louch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this
Second Day of December, 2014

Michelle K. Lee
*Deputy Director of the United States Patent and Trademark Office*